(12) United States Patent
Ikeda et al.

(10) Patent No.: US 8,877,384 B2
(45) Date of Patent: Nov. 4, 2014

(54) NEGATIVE ELECTRODE ACTIVE MATERIAL OF LITHIUM SECONDARY BATTERY, NEGATIVE ELECTRODE OF LITHIUM SECONDARY BATTERY, LITHIUM SECONDARY BATTERY FOR VEHICLE INSTALLATION USING THE NEGATIVE ELECTRODE ACTIVE MATERIAL AND NEGATIVE ELECTRODE, AND METHOD FOR MANUFACTURING THE NEGATIVE ELECTRODE ACTIVE MATERIAL

(75) Inventors: Taisa Ikeda, Kitakyushu (JP); Kazuki Tagawa, Kitakyushu (JP); Yoichi Kawano, Kitakyushu (JP)

(73) Assignee: Nippon Steel Chemical Co., Ltd., Tokyo (JP)

(*) Notice: Subject to any disclaimer, the term of this patent is extended or adjusted under 35 U.S.C. 154(b) by 317 days.

(21) Appl. No.: 13/319,602

(22) PCT Filed: May 14, 2010

(86) PCT No.: PCT/JP2010/003262
§ 371 (c)(1),
(2), (4) Date: Dec. 16, 2011

(87) PCT Pub. No.: WO2010/131476
PCT Pub. Date: Nov. 18, 2010

(65) Prior Publication Data
US 2012/0094179 A1   Apr. 19, 2012

(30) Foreign Application Priority Data

May 15, 2009  (JP) ................................ 2009-118855
May 10, 2010  (JP) ................................ 2010-108360

(51) Int. Cl.
*H01M 4/58* (2010.01)
*H01M 4/62* (2006.01)
*H01M 10/0525* (2010.01)
*H01M 4/587* (2010.01)

(52) U.S. Cl.
CPC .............. *H01M 4/587* (2013.01); *H01M 4/622* (2013.01); *H01M 4/623* (2013.01); *H01M 10/0525* (2013.01); *Y02E 60/122* (2013.01); *Y02T 10/7011* (2013.01)
USPC ...................... 429/231.8; 429/218; 252/182.1

(58) Field of Classification Search
USPC .......... 429/231.8, 218.1, 217, 212; 252/182.1
See application file for complete search history.

(56) References Cited

U.S. PATENT DOCUMENTS

| 4,188,279 | A | 2/1980 | Yan |
| 4,668,595 | A | 5/1987 | Yoshino et al. |
| 5,093,216 | A | 3/1992 | Azuma et al. |
| 5,358,805 | A | 10/1994 | Fujimoto et al. |
| RE34,991 | E | 7/1995 | Yoshino et al. |
| 5,958,622 | A | 9/1999 | Kojima et al. |
| 2004/0091782 | A1 | 5/2004 | Kawano et al. |
| 2005/0158624 | A1 | 7/2005 | Park et al. |

FOREIGN PATENT DOCUMENTS

| CA | 2 022 191 | 12/2000 |
| CA | 1 265 580 | 2/2006 |
| CH | 682078 A5 | 7/1993 |
| CN | 101087021 A | 12/2007 |
| DE | 690 08 978 T2 | 12/1994 |
| EP | 0 205 856 A2 | 12/1986 |
| EP | 0 418 514 A1 | 3/1991 |
| EP | 0 565 273 A1 | 10/1993 |
| EP | 0 754 746 A1 | 1/1997 |
| EP | 1 387 420 A1 | 2/2004 |
| EP | 1387420 * | 2/2004 .............. H01M 4/58 |
| JP | A-62-090863 | 4/1987 |
| JP | A-01-221859 | 9/1989 |
| JP | A-03-137010 | 6/1991 |
| JP | A-05-290843 | 11/1993 |
| JP | A-06-005287 | 1/1994 |
| JP | A-08-031422 | 2/1996 |
| JP | A-08-102324 | 4/1996 |
| JP | A-09-320599 | 12/1997 |
| JP | A-09-320602 | 12/1997 |
| JP | A-10-233207 | 9/1998 |
| JP | A-11-040158 | 2/1999 |
| JP | A-11-067207 | 3/1999 |
| JP | A-2002-270169 | 9/2002 |
| JP | A-2003-297357 | 10/2003 |
| JP | A-2005-056581 | 3/2005 |
| JP | A-2005-203370 | 7/2005 |
| WO | WO 02/071515 A1 | 9/2002 |
| WO | WO 02/089235 A1 | 11/2002 |

OTHER PUBLICATIONS

International Search Report issued in International Patent Application No. PCT/JP2010/003262 dated Aug. 17, 2010.
Dec. 12, 2013 Search Report issued in European Application No. EP 10 77 4735.

* cited by examiner

*Primary Examiner* — Raymond Alejandro
(74) *Attorney, Agent, or Firm* — Oliff PLC

(57) ABSTRACT

A negative electrode active material of lithium secondary battery include: at least one of a petroleum-derived green coke and a coal-derived green coke, and at least one of a petroleum-derived calcined coke and a coal-derived calcined coke within a mass ratio range of 90:10 to 10:90; a phosphorous compound within a range of 0.1 to 6.0 parts by mass in amount equivalent to phosphor relative to 100 parts by mass of the at least one of the green cokes and the at least one of the calcined cokes; and a boron compound within a range of 0.1 to 6.0 parts by mass in amount equivalent to boron relative to 100 parts by mass of the at least one of the green cokes and the at least one of the calcined cokes.

18 Claims, No Drawings

NEGATIVE ELECTRODE ACTIVE MATERIAL OF LITHIUM SECONDARY BATTERY, NEGATIVE ELECTRODE OF LITHIUM SECONDARY BATTERY, LITHIUM SECONDARY BATTERY FOR VEHICLE INSTALLATION USING THE NEGATIVE ELECTRODE ACTIVE MATERIAL AND NEGATIVE ELECTRODE, AND METHOD FOR MANUFACTURING THE NEGATIVE ELECTRODE ACTIVE MATERIAL

TECHNICAL FIELD

The present invention relates to a negative electrode active material of a lithium secondary battery, a negative electrode of lithium secondary battery, a lithium secondary battery using the negative electrode active material and the negative electrode, and a method for manufacturing the negative electrode active material.

BACKGROUND ART

Since a lithium secondary battery has a high energy density in comparison with another secondary battery, the lithium secondary battery can be downsized and reduced in weight. In this point of view, the lithium secondary battery is frequently utilized as an electric source of a mobile electric device such as a cellular phone, a personal computer, a personal digital assistant (PDA) and a handy video camera and in the future, the demand as the electric source is promising to be increased more than ever.

In order to cope with energy problem and environmental problem, moreover, an electric vehicle or a hybrid electric vehicle with a combination of a motor driven by a nickel hydride battery and a gasoline engine are developed and diffused conspicuously. In these uses, the high performance of the battery to be used is required to be developed more than ever and thus, attention is paid to the lithium secondary battery.

In the lithium secondary battery, various carbon materials with excellent safety and lifetime are generally used as the negative electrode active material. Among the carbon materials, graphite can be obtained at a high temperature at least more than 2000° C., normally within a range of about 2600 to 3000° C. and is excellent material because of having a high energy density, but has some problems in high input/output characteristic and cycle characteristic. In this point of view, for the use of the electric vehicle and the storage battery requiring the high input/output characteristics, for example, low crystalline carbon with low degree of graphitization, which is fired at a lower temperature in comparison with graphite, is mainly researched and used.

In view of the recent requirement of the higher performance of the hybrid vehicle, the lithium secondary battery is required to be highly developed in performance, which calls for urgent attention. With regard to the characteristics of the lithium secondary battery, the electric potential in the side of the negative electrode is sufficiently reduced to enhance the actual battery voltage and thus exhibit the highly and sufficiently output characteristic.

Moreover, the discharge capacity of the lithium secondary battery is an important characteristic in view of the sufficient supply of a current which is an energy source for the hybrid vehicle. Furthermore, the ratio of the charging capacity to the discharging capacity, that is, the initial efficiency is required to be set higher in view of the larger amount of discharging current in comparison with the amount of charging current.

In addition, it is preferable that the lithium secondary battery maintains a higher charging capacity even at high current density so as to realize the charging process in a short period of time so that the capacity retention rate of the lithium secondary battery is required to be developed.

Namely, it is required for the lithium secondary battery that the output characteristic, the discharging capacity, the initial efficiency and the capacity retention rate are developed under the proper balance condition.

In order to achieve the aforementioned requirement, as the negative electrode active material of the lithium secondary battery are intensely researched and developed carbon materials such as coke or graphite. In this case, the discharge capacity can be developed, but the initial efficiency cannot be sufficiently developed. Moreover, the actual battery voltage is not sufficient so as not to satisfy the requirement for the high output characteristic and the capacity retention rate at present.

In Reference 1, for example, as the negative electrode material utilizing intercalation or doping is disclosed a carbonaceous material defined in specific surface and X-ray diffraction crystal thickness, the carbonaceous material being obtained through the thermal decomposition or carbonization of an organic compound. However, the thus obtained negative electrode material is not sufficient for the use of a vehicle such as the electric vehicle.

In Reference 2, as the negative electrode material is disclosed a carbon material with excellent cycle characteristic and higher discharge capacity, the carbon material being obtained through the thermal treatment for calcined coke as a raw material to remove impurities therefrom under a non-reactive atmosphere. However, the thus obtained negative electrode material is not sufficient in output characteristic and the like for the use of a vehicle such as the electric vehicle.

In Reference 3, as the negative electrode material is disclosed a carbon material, the carbon material being obtained through the thermal treatment for a carbonaceous material with a cover layer which the carbonaceous material has a crystalline structure similar to that of graphite. In Reference 4, as the negative electrode material is disclosed a carbon material with higher discharge capacity, the carbon material being obtained through the thermal treatment at low temperature for coke as a raw material under a non-reactive atmosphere to remove impurities therefrom conspicuously. However, both of the carbon materials are not sufficient in battery characteristics for the use of a vehicle such as the electric vehicle.

In Reference 5, as the negative electrode material is disclosed a thermally treated coke for providing a lithium secondary battery with high charge capacity and discharge capacity, the coke being obtained through the thermal treatment within a temperature range of 500 to 850° C. for a green coke derive from a petroleum or a coal. However, the coke is not sufficient in output characteristic for the use of a vehicle such as the electric vehicle.

The research and development of the negative electrode material of the lithium secondary battery made of the low crystalline carbon material using the coke or the like as the raw material is directed at the improvement in characteristic of the negative electrode material of the lithium secondary battery for the use of an electric source for a small mobile instruments, but, as of now, the research and development of the negative electrode material of the lithium secondary battery is not directed at the enhancement in characteristic of the negative electrode material of the lithium secondary battery with large current input/output characteristics suitable for the use of an electric source for the electric vehicle.

On the other hand, such an attempt as adding various compounds into an organic material or a carbonaceous material to enhance the battery performances is made.

In Reference 6, for example, a negative electrode material obtained by adding a phosphorous compound into an organic material or a carbonaceous material and carbonizing the material is disclosed. In Reference 7, moreover, a negative electrode material obtained by carbonizing a carbon material containing boron and silicon therein. Both of the negative electrode materials, however, are not sufficient in output characteristic for the use of a vehicle such as the electric vehicle.

REFERENCE LIST

Reference 1: JP-A 62-90863
Reference 2: JP-A 01-221859
Reference 3: JP-A 06-5287
Reference 4: JP-A 08-102324
Reference 5: JP-A 09-320602
Reference 6: JP-A 03-137010
Reference 7: JP-A 11-40158

DISCLOSURE OF THE INVENTION

Problem to be Solved by the Invention

It is an object of the present invention to provide a new negative electrode active material which can develop the output characteristic of a lithium secondary battery and have actual characteristics such as discharge capacity, initial efficiency and capacity retention rate which are required for the use of a vehicle such as an electric vehicle.

Technical Solution

The present invention relates to a negative electrode active material of lithium secondary battery, including: at least one of a petroleum-derived green coke and a coal-derived green coke, and at least one of a petroleum-derived calcined coke and a coal-derived calcined coke within a mass ratio range of 90:10 to 10:90; a phosphorous compound within a range of 0.1 to 6.0 parts by mass in amount equivalent to phosphor relative to 100 parts by mass of the at least one of the green cokes and the at least one of the calcined cokes; and a boron compound within a range of 0.1 to 6.0 parts by mass in amount equivalent to boron relative to 100 parts by mass of the at least one of the green cokes and the at least one of the calcined cokes. The inventors have found out that the aforementioned negative electrode active material according to the present invention can sufficiently reduce the electric potential of the negative electrode of the lithium secondary battery so as to enhance the actual battery voltage thereof and have some practical characteristics such as output characteristic, discharge capacity, initial efficiency and capacity retention rate which are required in the use of vehicle installation.

Here, the term "green coke derived from the coal or the like" means a coke obtained through the thermal decomposition and polycondensation of a petroleum-derived heavy oil and/or coal-derived heavy oil at a maximum achieving temperature within a range of 400 to 700° C. for about 24 hours by using a coking machine such as a delayed coker. Moreover, the term "calcined coke derived from the coal or the like" means a coke calcined for the green coke derived from the coal or the like, and a petroleum-derived and/or coal-derived coke(s) calcined at a maximum achieving temperature within a range of 800 to 1500° C.

Advantageous Effect

According to the present invention can be provided a new negative electrode active material which can develop the output characteristic of a lithium secondary battery and have actual characteristics such as discharge capacity, initial efficiency and capacity retention rate which are required for the use of a vehicle such as an electric vehicle.

BEST MODE FOR CARRYING OUT THE INVENTION

Hereinafter, details, other features and advantages of the present invention will be described.

In the negative electrode active material of a lithium secondary battery according to the present invention, first of all, a coal-derived heavy oil or the like is thermally decomposed and polycondensed at a maximum achieving temperature within a temperature range of 400 to 700° C. for 24 hours by using an appropriate coking machine such as a delayed coker to obtain a green coke derived from the coal or the like. Then, the green coke is pulverized into particles with a predetermined size. The pulverization process is conducted by a pulverizing machine industrially available. Concretely, an atomizer, a Raymond mill, an impeller mill, a ball mill, a cutter mill, a jet mill or a hybridizer may be exemplified, but not restrictive.

The heavy oil to be used may be a petroleum-derived heavy oil or a coal-derived heavy oil, but preferably the coal-derived heavy oil because the coal-derived heavy oil is rich in aromaticity so as to have little amounts of impurities such as nitrogen and sulfur causing the irreversible reaction with lithium and have little amounts of volatiles.

The green coke derived from the coal or the like is calcined at a maximum achieving temperature within a temperature range of 800 to 1500° C. to produce a calcined coke derived from the coal or the like. The maximum achieving temperature is preferably set within a temperature range of 1000 to 1500° C., more preferably within a temperature range of 1200 to 1500° C. The calcination process may be conducted by using an appropriate calciner such as a Riedhammer oven, a shuttle oven, a tunnel kiln oven, a rotary kiln oven, a roller hearth kiln oven or a microwave, but not restrictive. The calciner may be a continuous calciner or a batch calciner. Then, the thus obtained lump calcined coke derived from the coal or the like is pulverized into particles using a pulverizing machine such as the atomizer.

The sizes of the green coke particles and the calcined coke particles are not particularly limited, but the respective average particle sizes as median sizes of the green coke particles and the calcined coke particles are set preferably within a range of 5 to 15 μm while the respective BET specific surface areas thereof are preferably set to 5 $m^2$/g or less. If the average particle sizes thereof are set less than 5 μm, the specific surface areas may be too increased so that the initial efficiency of the lithium secondary battery made of the green coke particles and the calcined coke particles may be deteriorated. If the average particle sizes thereof are set more than 15 μm, the charge/discharge characteristic of the lithium secondary battery made of the green coke particles and the calcined coke particles may be deteriorated. If the respective BET specific surface areas thereof are set more than 5 $m^2$/g, as described above, the respective specific surface areas thereof are too increased so that the initial efficiency of the lithium secondary battery made of the green coke particles and the calcined coke particles may be deteriorated. The BET specific surface areas thereof may be set to 2 $m^2/g$ or more in view of the formation of micro pores therein.

Then, the green coke particles and the calcined coke particles are mixed at a predetermined ratio. For example, the mixing ratio thereof (green coke particles:calcined coke particles) is preferably set within a range of 90:10 to 10:90 at mass ratio, more preferably within a range of 70:30 to 30:70 at mass ratio. If the ratio of the calcined coke is increased, the output characteristic of the obtained lithium secondary battery is enhanced. If the ratio of the green coke is increased, the discharge capacity and the initial characteristic of the obtained lithium secondary battery are enhanced. Depending on which of the characteristics is enhanced, the ratio of the calcined coke is set to 50% or more if the output characteristic of the lithium secondary battery is enhanced.

If the mixing ratio is set except the aforementioned range, the negative electrode of the lithium secondary battery made of the negative electrode active material may not be sufficiently reduced in electric potential so as not to enhance the actual battery voltage thereof and realize the sufficiently high output characteristic thereof. Moreover, the resistance of the lithium secondary battery may be increased at the end of charge and discharge so that the lithium secondary battery may not exhibit the stable charge/discharge characteristic thereof.

A phosphorous compound and a boron compound are added into the coke particles. The addition process is conducted by mixing the green coke, the calcined coke, the phosphorous compound and the boron compound at a ratio as will described below and putting the cokes and the compounds in a prescribed mold (first addition method).

The addition process may be conducted when the lump green coke derived from the coal or the like and the lump calcined coke derived from the coal or the like are obtained, instead of the step after the lump green coke and the lump calcined coke are pulverized (second addition method). In this case, the lump green coke and the lump calcined coke are put in a pulverizing machine while the phosphorous compound and the boron compound are put in the same pulverizing machine, so that the green coke particles and the calcined coke particles with the phosphorous compound and the boron compound therein can be obtained through pulverization.

Therefore, since the phosphorous compound and the boron compound can be added simultaneously when the lump green coke and the lump calcined coke are pulverized, the additional addition process of the phosphorous compound and the boron compound can be omitted, so that the total manufacturing process for the negative electrode active material of the lithium secondary battery can be simplified.

Here, the first addition method and the second addition method only differentiate the concrete addition means so as to differentiate the total manufacturing process for the negative electrode active material of the lithium secondary battery and not almost to differentiate the output characteristic, the discharge capacity, the initial efficiency and the capacitance retention rate of the lithium secondary battery made of the negative electrode active material.

The additive amount of the phosphorous compound is preferably set within a range of 0.1 to 6.0 parts by mass in equivalent amount of phosphor relative to 100 parts by mass of the total amount of the green coke and the calcined coke, more preferably within a range of 0.5 to 5.0 parts by mass thereto. If the additive amount is set less than the lower limited value, the function/effect of the addition of the phosphorous compound may not be exhibited sufficiently. If the additive amount is set more than the upper limited value, the low crystallization at the surface of the cokes is progressed so that the output characteristic of the thus obtained lithium secondary battery may be deteriorated.

The additive amount of the boron compound is preferably set within a range of 0.1 to 6.0 parts by mass in equivalent amount of boron relative to 100 parts by mass of the total amount of the green coke and the calcined coke, more preferably within a range of 0.5 to 5.0 parts by mass thereto. If the additive amount is set less than the lower limited value, the function/effect of the addition of the phosphorous compound may not be exhibited sufficiently. If the additive amount is set more than the upper limited value, the carbonization of the cokes is too progressed so that not-reacted boron may remain as it is and thus the output characteristic, the discharge capacity, the initial efficiency and the capacity retention rate of the thus obtained lithium secondary battery may be deteriorated.

As the phosphorous compound is desired a phosphorous compound classified into phosphoric acids which can easily make an aqueous solution and have high safety. As the phosphoric acids is preferably exemplified phosphoric acid (orthophosphoric acid), but may be appropriately selected from linear polyphosphoric acid, cyclic polyphosphoric acid and phosphoric acid ester. One of the listed phosphoric acids may be employed or the mixture of two or more thereof may be employed.

As the boron compound may be preferably used boron carbide ($B_4C$) because if the boron carbide is decomposed at firing, the thus obtained elements are boron for realizing the object of the present invention and carbon as a constituent element of the coke matrix of the negative electrode active material, which can suppress the adverse affect for the negative electrode active material.

Then, the green particles and the calcined particles with the phosphorous compound and the boron compound therein are fired. The firing temperature is preferably set within a maximum achieving temperature within a range of 800 to 1400° C., more preferably within a range of 900 to 1200° C., particularly preferably within a range of 900 to 1100° C. If the firing temperature is set more than the upper limited value, the crystal growth in the coke particles is too progressed so that the output characteristic, the discharge capacity, the initial efficiency and the capacity retention rate of the thus obtained lithium secondary battery may be deteriorated, which is undesirable in view of the mass production of the lithium secondary battery. On the other hand, if the firing temperature is set less than the lower limited value, the crystal growth in the coke particles is suppressed while the phosphorous compound and the boron compound may not be added as desired in the carbonization of the cokes, thereby deteriorating the output characteristic, the discharge capacity and the capacity retention rate.

The holding time at the maximum achieving temperature is not limited, but preferably set to 30 minutes or more. Moreover, the firing atmosphere is not limited, but may be set to non-reactive atmosphere such as argon atmosphere or nitrogen atmosphere or non-oxidizing atmosphere which is realized in a non-airtight atmosphere such as in a rotary kiln oven or in an airtight atmosphere such as in a Riedhammer oven.

In the case where the negative electrode active material is applied to the negative electrode of the lithium secondary battery, as a positive electrode active material may be used lithium-containing transition metal oxides $LiM(1)xO_2$ or $LiM(1)_yM(2)_{2-y}O_4$ (wherein $M(1)$ and $M(2)$ are a transition metal selected from the group consisting of Co, Ni, Mn, Ti, Cr, V, Fe, Zn, Al, Sn and In, respectively, and x and y are independently numbers in a range of 0-1), transition metal chalcogenides ($TiS_2$, $NbSe_3$, etc.), vanadium oxides ($V_2O_5$, $V_6O_{13}$, $V_2O_4$, $V_3O_8$, etc.) and lithium compounds thereof, Chevrel phase compound represented by the general formula $MxMo_6Ch_{8-y}$ (wherein x is a number in a range of 0-4, y is a number in a range of 0-1, M is a metal such as transition metal and Ch denotes a chalcogen), activated carbon and activated carbon fibers.

As an electrolyte for charging the space between the positive electrode and the negative electrode can be used singly or as a mixture of two kinds or more a conventionally well known electrolyte material such as $LiClO_4$, $LiBF_4$, $LiPF_6$, $LiAsF_6$, $LiB (C_6H_5)$, LiCl, LiBr, $Li_3SO_3$, $Li (CF_3SO_2)_2N$, $Li (CF_3CF_2CH_2OSO_2)_2N$, $Li (HCF_2CF_2CH_2OSO_2)_2N$, $Li [(CF_3)_2CHOSO_2]_2N$ or $LiB[C_6H_3 (CF_3)_2]_4$.

The following compounds are examples of nonaqueous electrolytes and may be used singly or as a mixture of two kinds or more although there is no specific restriction on the selection of nonaqueous electrolytes; propylene carbonate, ethylene carbonate, butylene carbonate, chloroethylene carbonate, dimethyl carbonate, diethyl carbonate, ethyl methyl carbonate, 1,1-dimethoxyethane, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, anisole, diethyl ether, sulfolane, methylsulfolane, acetonitrile, chloronitrile, propionitrile, trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethyl sulfoxide, 3-methyl-2-oxazolidone, ethylene glycol, sulfites, and dimethyl sulfite.

In the case where the negative electrode of the lithium secondary battery is made of the negative electrode active material, as a carbonaceous binder is used fluorine-based resin powder made of polyvinylidene fluoride (PVDF), etc., or a water-soluble bond such as polyimide, polyamide imide, siloxane polyimide, stylene-butadiene rubber (SBR) or carboxymethylcellulose. Then, the negative electrode active material and the binder are mixed in a solvent such as N-methylpyrrolidone (NMP), dimethylformamide, dimethylacetamide, water or alcohol to make a slurry. Then, the slurry is applied and dried onto a current collector.

EXAMPLES

Hereinafter, examples (negative electrode active material of lithium secondary battery), reference examples and comparative examples will be described. Here, the present invention is not restricted to these examples.

Example 1

A lump coke (green coke) manufactured by thermally treating a purified pitch, which was obtained by removing quinoline-insoluble components from a coal-derived heavy oil, at a temperature of 500° C. for 24 hours by means of delayed coking, was pulverized and regulated in size with a jet mill to make green coke particles with an average particle size of 9.9 μm.

Then, the lump green coke obtained in the same manner as described above was thermally treated for 1 hour or more by means of a rotary kiln oven under the condition that the temperature distribution in the oven is set so as to change from a temperature of 700° C. in the vicinity of the inlet of the oven to a temperature of 1500° C. (maximum achieving temperature) in the vicinity of the outlet of the oven to make a lump calcined coke. Then, the lump calcined coke was pulverized and regulated in size with a jet mill to make calcined coke particles with an average particle size of 9.5 μm.

Then, 17.9 parts by mass (2.5 parts by mass in equivalent amount of phosphor) of a phosphoric acid ester (14 mass % active phosphor solid resin HCA (trade name) made by SANKO CO., LTD., chemical name: 9,10-dihydro-9-oxa-10-phosphaphenanthrene-10-oxide) and 3.2 parts by mass (2.5 parts by mass in equivalent amount of boron) were added to the mixture of 70 parts by mass of the green coke particles and 30 parts by mass of the calcined coke particles (that is, 100 parts by mass of coke material).

Then, the coke material with the phosphoric acid ester and the boron carbide added therein was heated from room temperature to 900° C. (maximum achieving temperature) at a heating rate of 600° C./min and kept for 2 hours as it is to be carbonized (fired), thereby making a negative electrode active material of lithium secondary battery.

Then, polyvinylidene fluoride was added as a binder to the negative electrode active material by 5 mass %, and the thus obtained mixture was kneaded using N-methylpyrrolidone as a solvent to make a slurry. The slurry was coated uniformly on a copper foil with a thickness of 18 μm to make a negative electrode foil. Then, the negative electrode foil was dried and pressed in a predetermined electrode density to make an electrode sheet. Then, the negative electrode sheet was cut out in a form of circle to make a negative electrode with a diameter of 15 mm. In order to evaluate the electrode characteristics of only the negative electrode, a metallic lithium with a diameter of 15.5 mm was used as a counter electrode.

$LiPF_6$ with a concentration of 1 mol/l was added into the mixture of ethylene carbonate and diethyl carbonate (mixing volume ratio=1:1) and the thus obtained solution was used as an electrolysis solution. Then, a coil cell was made from propylene porous film as a separator. Next, the discharge characteristics for the thus obtained lithium secondary battery were evaluated when a constant current discharge of 5 $mA/cm^2$ was conducted under a constant temperature of 25° C. within a predetermined voltage range of which the charge lower limited voltage of terminal voltage was set to 0 V and of which the discharge upper limited voltage was set to 1.5 V. The results relating to the discharge characteristics are listed in Table 1.

Examples 2 to 4

An intended negative electrode active material of lithium secondary battery was made in the same manner as in Example 1 except that the mixing ratio of the green coke particles and the calcined coke particles was varied to a ratio of 50:50 (Example 2), 40:60 (Example 3) and 30:70 (Example 4) from 70:30 by mass ratio. The results relating to the discharge characteristics are listed in Table 1.

Reference Example 1

An intended negative electrode active material of lithium secondary battery was made in the same manner as in Example 1 except that 100 parts by mass of the green coke particles were used with no mixing of the calcined coke particles. The results relating to the discharge characteristics are listed in Table 1.

Comparative Example 1

An intended negative electrode active material of lithium secondary battery was made in the same manner as in Example 1 except that 100 parts by mass of the green coke particles were used with no mixing of the calcined coke particles and no adding of the phosphoric acid ester and the boron carbide. The results relating to the discharge characteristics are listed in Table 1.

Comparative Example 2

An intended negative electrode active material of lithium secondary battery was made in the same manner as in Example 1 except that 100 parts by mass of the calcined coke particles were used with no mixing of the green coke particles and no adding of the phosphoric acid ester and the boron carbide. The results relating to the discharge characteristics are listed in Table 1.

Examples 5 to 7

Intended negative electrode active material were made in the same manner as in Examples 1, 2 and 4, respectively, except that the firing temperature (maximum achieving temperature) of the coke material was varied to 1000° C. from 900° C. The results relating to the discharge characteristics are listed in Table 1.

Reference Example 2

An intended negative electrode active material of lithium secondary battery was made in the same manner as in Example 5 except that 100 parts by mass of the green coke particles were used with no mixing of the calcined coke particles.

Comparative Example 3

An intended negative electrode active material of lithium secondary battery was made in the same manner as in Example 5 except that 100 parts by mass of the green coke particles were used with no mixing of the calcined coke particles and no adding of the phosphoric acid ester and the boron carbide. The results relating to the discharge characteristics are listed in Table 1.

Comparative Example 4

An intended negative electrode active material of lithium secondary battery was made in the same manner as in Example 5 except that 100 parts by mass of the calcined coke particles were used with no mixing of the green coke particles and no adding of the phosphoric acid ester and the boron carbide. The results relating to the discharge characteristics are listed in Table 1.

Example 8

An intended negative electrode active materials was made in the same manner as in Example 2 except that the firing temperature (maximum achieving temperature) of the coke material was varied to 1100° C. from 900° C. The results relating to the discharge characteristics are listed in Table 1.

Reference Example 3

An intended negative electrode active material of lithium secondary battery was made in the same manner as in Example 8 except that 100 parts by mass of the green coke particles were used with no mixing of the calcined coke particles. The results relating to the discharge, characteristics are listed in Table 1.

Comparative Example 5

An intended negative electrode active material of lithium secondary battery was made in the same manner as in Example 8 except that 100 parts by mass of the green coke particles were used with no mixing of the calcined coke particles and no adding of the phosphoric acid ester and the boron carbide.

Comparative Example 6

An intended negative electrode active material of lithium secondary battery was made in the same manner as in Example 8 except that 100 parts by mass of the calcined coke particles were used with no mixing of the green coke particles and no adding of the phosphoric acid ester and the boron carbide. The results relating to the discharge characteristics are listed in Table 1.

Examples 9 to 16

An intended negative electrode active material of lithium secondary battery was made in the same manner as in Example 2 except that the equivalent amount of phosphor and the equivalent amount of boron were varied to 0.5 part by mass and 0.5 part by mass (Example 9), 0.5 part by mass and 2.5 parts by mass (Example 10), 0.5 part by mass and 5.0 parts by mass (Example 11), 2.5 parts by mass and 0.5 part by mass (Example 12), 2.5 parts by mass and 5.0 parts by mass (Example 13), 5.0 parts by mass and 0.5 part by mass (Example 14), 5.0 parts by mass and 2.5 parts by mass (Example 15) and 5.0 parts by mass and 5.0 parts by mass (Example 16) from 2.5 parts by mass and 2.5 parts by mass, respectively. The results relating to the discharge characteristics are listed in Table 2.

TABLE 1

| | Carbon (part by mass) | Green coke (part by mass) | Calcined coke (part by mass) | Phosphorous compound (part by mass) | Boron compound (part by mass) | Firing temperature (° C.) | DOD: 50 (V) | Output characteristic (W) | Discharge capacity (mAh/g) | Initial efficiency (%) | 0.5 mA/cm² Retention rate (%) | 2.5 mA/cm² Retention rate (%) | 5.0 mA/cm² Retention rate (%) |
|---|---|---|---|---|---|---|---|---|---|---|---|---|---|
| Comparative Example 1 | 100 | 100 | 0 | 0 | 0 | 900 | 0.66 | 9.3 | 456 | 77.4 | 96.8 | 79.7 | 59.1 |
| Reference Example 1 | | 100 | 0 | 2.5 | 2.5 | | 0.63 | 13.4 | 445 | 83.3 | 104.5 | 90.4 | 84.4 |
| Example 1 | | 70 | 30 | 2.5 | 2.5 | | 0.46 | 14.0 | 339 | 85.0 | 97.6 | 90.4 | 83.8 |

TABLE 1-continued

| | Carbon (part by mass) | Green coke (part by mass) | Calcined coke (part by mass) | Phosphorous compound (part by mass) | Boron compound (part by mass) | Firing temperature (°C.) | DOD: 50 (V) | Output characteristic (W) | Discharge capacity (mAh/g) | Initial efficiency (%) | 0.5 mA/cm$^2$ Retention rate (%) | 2.5 mA/cm$^2$ Retention rate (%) | 5.0 mA/cm$^2$ Retention rate (%) |
|---|---|---|---|---|---|---|---|---|---|---|---|---|---|
| Example 2 | | 50 | 50 | 2.5 | 2.5 | | 0.42 | 14.9 | 328 | 88.5 | 97.5 | 91.9 | 88.1 |
| Example 3 | | 40 | 60 | 2.5 | 2.5 | | 0.37 | 15.3 | 291 | 86.6 | 99.7 | 95.8 | 89.5 |
| Example 4 | | 30 | 70 | 2.5 | 2.5 | | 0.36 | 15.5 | 298 | 85.9 | 97.6 | 94.2 | 90.2 |
| Comparative Example 2 | | 0 | 100 | 0 | 0 | | 0.25 | 17.0 | 243 | 86.2 | 99.2 | 96.3 | 95.9 |
| Comparative Example 3 | | 100 | 0 | 0 | 0 | 1,000 | 0.41 | 11.1 | 323 | 76.4 | 93.0 | 76.9 | 65.2 |
| Reference Example 2 | | 100 | 0 | 2.5 | 2.5 | | 0.41 | 14.3 | 345 | 84.5 | 98.6 | 91.1 | 84.6 |
| Example 5 | | 70 | 30 | 2.5 | 2.5 | | 0.37 | 15.5 | 296 | 84.8 | 100.0 | 94.2 | 90.6 |
| Example 6 | | 50 | 50 | 2.5 | 2.5 | | 0.34 | 16.7 | 293 | 85.6 | 101.4 | 97.2 | 96.5 |
| Example 7 | | 30 | 70 | 2.5 | 2.5 | | 0.28 | 17.0 | 288 | 86.0 | 100.7 | 97.2 | 96.4 |
| Comparative Example 4 | | 0 | 100 | 0 | 0 | | 0.24 | 17.1 | 243 | 85.9 | 100.0 | 97.1 | 96.3 |
| Comparative Example 5 | | 100 | 0 | 0 | 0 | 1,100 | 0.33 | 15.0 | 283 | 78.6 | 98.9 | 92.0 | 86.2 |
| Reference Example 3 | | 100 | 0 | 2.5 | 2.5 | | 0.35 | 15.9 | 306 | 86.0 | 98.4 | 94.8 | 92.1 |
| Example 6 | | 50 | 50 | 2.5 | 2.5 | | 0.35 | 15.7 | 299 | 90.1 | 99.3 | 95.2 | 91.0 |
| Comparative Example 6 | | 0 | 100 | 0 | 0 | | 0.24 | 17.3 | 238 | 84.7 | 99.6 | 97.5 | 97.0 |

TABLE 2

| | Carbon (part by mass) | Green coke (part by mass) | Calcined coke (part by mass) | Phosphorous compound (part by mass) | Boron compound (part by mass) | Firing temperature (°C.) | DOD: 50 (V) | Output characteristic (W) | Discharge capacity (mAh/g) | Initial efficiency (%) | 0.5 mA/cm$^2$ Retention rate (%) | 2.5 mA/cm$^2$ Retention rate (%) | 5.0 mA/cm$^2$ Retention rate (%) |
|---|---|---|---|---|---|---|---|---|---|---|---|---|---|
| Comparative Example 1 | 100 | 100 | 0 | 0 | 0 | 900 | 0.66 | 9.3 | 456 | 77.4 | 96.8 | 79.7 | 59.1 |
| Reference Example 1 | | 100 | 0 | 2.5 | 2.5 | | 0.63 | 13.4 | 445 | 83.3 | 104.5 | 90.4 | 84.4 |
| Example 9 | | 50 | 50 | 0.5 | 0.5 | | 0.42 | 14.8 | 358 | 82.7 | 98.1 | 92.2 | 87.7 |
| Example 10 | | 50 | 50 | 0.5 | 2.5 | | 0.42 | 15.2 | 324 | 85.2 | 99.5 | 93.5 | 89.9 |
| Example 11 | | 50 | 50 | 0.5 | 5.0 | | 0.36 | 15.9 | 299 | 81.8 | 100.9 | 94.9 | 92.3 |
| Example 12 | | 50 | 50 | 2.5 | 0.5 | | 0.46 | 14.0 | 339 | 85.0 | 99.2 | 93.4 | 83.8 |
| Example 2 | | 50 | 50 | 2.5 | 2.5 | | 0.42 | 14.9 | 328 | 88.5 | 97.5 | 91.9 | 88.1 |
| Comparative Example 13 | | 50 | 50 | 2.5 | 5.0 | | 0.42 | 15.1 | 332 | 87.6 | 98.9 | 93.0 | 89.4 |
| Reference Example 14 | | 50 | 50 | 5.0 | 0.5 | | 0.61 | 14.6 | 427 | 81.1 | 100.4 | 94.2 | 91.5 |
| Example 15 | | 50 | 50 | 5.0 | 2.5 | | 0.52 | 15.0 | 382 | 83.9 | 99.7 | 93.6 | 91.5 |
| Example 16 | | 50 | 50 | 5.0 | 5.0 | | 0.43 | 15.3 | 337 | 86.7 | 99.3 | 93.3 | 90.9 |
| Comparative Example 2 | | 0 | 100 | 0.0 | 0.0 | | 0.25 | 17.0 | 243 | 86.2 | 99.2 | 96.3 | 95.9 |

As is apparent from Tables 1 and 2, in each of the lithium secondary batteries relating to Examples which are obtained by mixing the green coke particles and the calcined coke particles, adding the phosphoric acid ester and the boron carbide into the mixture thereof and firing the mixture with the phosphoric acid ester and the boron carbide added therein, the DOD (Depth of Discharge): 50 is decreased and the output characteristic are increased as the mixing ratio of the calcined coke to the green coke is increased in comparison with each of the lithium secondary batteries relating to Comparative Examples. Namely, in Examples, the substantial electric voltage of each of the negative electrodes made of the carbon materials for negative electrode is decreased so that the actual battery voltage of the corresponding lithium secondary battery is increased, thereby enhancing the output characteristic thereof.

On the other hand, the discharge capacity (mAh/g) is decreased as the mixing ratio of the calcined coke to the green coke is increased. The dependency of the initial efficiency on the mixing ratio of the calcined coke to the green coke is not particularly recognized. It is found out that in Examples, each of the lithium secondary batteries can exhibit the large discharge capacity of 80 (mAh/g) or more.

As a result, as shown in Examples, it is found out that the characteristic balance relating to the output characteristic, the discharge capacity, the initial efficiency and the capacity retention rate of the lithium secondary battery is excellent. By setting the mixing ratio within the range of 70:30 to 30:70, particularly, the lithium secondary battery (i.e., the negative electrode active material of lithium secondary battery) having excellent discharge characteristics such as an output characteristic (W) of 14 (W) or more, a discharge capacity (mAh/g) of 280 (mAh/g) or more, an initial efficiency (%) of 80(%) or more and a capacity retention rate (%) of 80(%) or more can be obtained.

In Comparative examples 1, 3 and 5, only the green coke particles (no addition of the calcined coke particles) were used. In these cases, the initial efficiency (%) is less than 80(%) which means that the initial efficiency (%) in these comparative examples are poorer than the initial efficiency (%) in Examples according to the present invention. Moreover, it is turned out that the capacity retention rate in these comparative examples are also poorer than the capacity retention rate in Examples at every firing temperature.

In Comparative examples 2, 4 and 6, only the calcined coke particles (no addition of the green coke particles) were used. In these cases, the discharge capacity (mAh/g) is less than 250 (mAH/g), which means that the discharge capacity (mAh/g) in these comparative examples are poorer than the discharge capacity (mAh/g) in Examples according to the present invention.

Example 17

An intended negative electrode active material of lithium secondary battery was made in the same manner as in Example 2 except that the binder for making the negative electrode foil is varied to a polyimide (made by UBE INDUSTRIES, LTD.) from the polyvinylidene fluoride. Then, the discharge characteristics were evaluated in the same manner in Example 1. The results relating to the discharge characteristics are listed in Table 3 with the results relating to Example 2 for comparison.

Example 18

An intended negative electrode active material of lithium secondary battery was made in the same manner as in Example 5 except that the binder for making the negative electrode foil is varied to a polyimide (made by UBE INDUSTRIES, LTD.) from the polyvinylidene fluoride. Then, the discharge characteristics were evaluated in the same manner in Example 1. The results relating to the discharge characteristics are listed in Table 3 with the results relating to Example 5 for comparison.

Example 19

An intended negative electrode active material of lithium secondary battery was made in the same manner as in Example 8 except that the binder for making the negative electrode foil is varied to a polyimide (made by UBE INDUSTRIES, LTD.) from the polyvinylidene fluoride. Then, the discharge characteristics were evaluated in the same manner in Example 1. The results relating to the discharge characteristics are listed in Table 3 with the results relating to Example 2 for comparison.

polyimide from the polyvinylidene fluoride, the DOD (Depth of Discharge): 50 is decreased and the output characteristic is increased. Namely, in these cases, the substantial electric voltage of each of the negative electrodes made of the carbon materials for negative electrode is decreased so that the actual battery voltage of the corresponding lithium secondary battery is increased, thereby enhancing the output characteristic thereof.

In these cases, the lithium secondary battery (i.e., the negative electrode active material of lithium secondary battery) having excellent discharge characteristics such as an output characteristic (W) of 15 (W) or more, a discharge capacity (mAh/g) of 280 (mAh/g) or more, an initial efficiency (%) of 83(%) or more and a capacity retention rate (%) of 95(%) or more can be obtained.

As is apparent from Table 3, on the other hand, the DOD (Depth of Discharge): 50 of the lithium secondary battery using the polyimide as the binder for making the negative electrode thereof is decreased so that the output characteristic (W) is increased in comparison with the DOD and output characteristic (W) of the lithium secondary battery using the polyvinylidene fluoride for making the negative electrode thereof. Moreover, the capacity retention rate in the use of the polyimide is also increased in comparison with the capacity retention rate in the use of the polyvinylidene fluoride. Here, the reason the variation of kind of binder affects the discharge characteristics is not clarified at present.

Although the present invention was described in detail with reference to the above examples, this invention is not limited to the above disclosure and every kind of variation and modification may be made without departing from the scope of the present invention.

What is claimed is:
1. A negative electrode active material of lithium secondary battery, comprising:
   coke comprising at least one green coke and at least one calcined coke, the green coke and the calcined coke being present in a mass ratio of 90:10 to 10:90, the green coke comprising one or more selected from the group consisting of a petroleum-derived green coke and a coal-derived green coke, and the calcined coke comprising one or more selected from the group consisting of a petroleum-derived calcined coke and a coal-derived calcined coke;
   a phosphorous compound comprising phosphorous, the phosphorous and the coke being present in a ratio of 0.1:100 to 6.0:100 parts by mass; and

TABLE 3

| | Carbon (part by mass) | Green coke (part by mass) | Calcined coke (part by mass) | Phosphorous compound (part by mass) | Boron compound (part by mass) | Firing temperature (° C.) | Binder | DOD: 50 (V) | Output characteristic (W) | Discharge capacity (mAh/g) | Initial efficiency (%) | 0.5 mA/cm$^2$ Retention rate (%) | 2.5 mA/cm$^2$ Retention rate (%) | 5.0 mA/cm$^2$ Retention rate (%) |
|---|---|---|---|---|---|---|---|---|---|---|---|---|---|---|
| Example 2 | 100 | 50 | 50 | 2.5 | 2.5 | 900 | PVDF | 0.42 | 14.9 | 328 | 88.5 | 97.5 | 91.9 | 88.1 |
| Example 17 | | | | | | | PI | 0.47 | 15.2 | 321 | 86.7 | 99.5 | 95.5 | 91.5 |
| Example 6 | | | | | | 1000 | PVDF | 0.34 | 16.7 | 293 | 85.6 | 101.4 | 97.2 | 96.5 |
| Example 18 | | | | | | | PI | 0.40 | 16.6 | 287 | 83.9 | 100.0 | 98.2 | 97.5 |
| Example 8 | | | | | | 1100 | PVDF | 0.35 | 15.7 | 299 | 90.1 | 99.3 | 95.2 | 91.0 |
| Example 19 | | | | | | | PI | 0.41 | 16.5 | 293 | 88.3 | 100.0 | 99.0 | 98.1 |

As is apparent from Table 3, in the cases where the binder for making the negative electrode with the negative electrode active material of lithium secondary battery is varied to the a boron compound comprising boron, the boron and the coke being present in a ratio of 0.1:100 to 6.0:100 parts by mass.

2. The negative electrode active material as set forth in claim 1, wherein the green coke is a powdery green coke and the calcined coke is a powdery calcined coke.

3. The negative electrode active material as set forth in claim 1, wherein the mass ratio of the green coke and the calcined coke is 70:30 to 30:70.

4. The negative electrode active material as set forth in claim 1, wherein:
the ratio of phosphorous to coke is 0.5:100 to 5.0:100 parts by mass, and
the ratio of boron to coke is 0.5:100 to 5.0:100 parts by mass.

5. The negative electrode active material as set forth in claim 2, wherein the powdery green coke has an average particle size of 5 to 15 μm.

6. The negative electrode active material as set forth in claim 2, wherein the powdery green coke has a BET specific surface area of 5 $m^2$/g or less.

7. The negative electrode active material as set forth in claim 1, wherein the coke is fired with the phosphorous compound and the boron compound at a temperature of 800 to 1400° C.

8. The negative electrode active material as set forth in claim 1, further comprising an output characteristic of 14 watts or more, an initial efficiency of 80% or more, and a capacity retention rate of 80% or more.

9. A lithium secondary battery comprising:
a negative electrode active material of lithium secondary battery as set forth in claim 1, and
a binder for the negative electrode active material.

10. The lithium secondary battery as set forth in claim 9, wherein the binder is at least one of polyvinylidene fluoride and polyimide.

11. The lithium secondary battery as set forth in claim 10, wherein the binder is polyimide.

12. A secondary battery for vehicle installation comprising a negative electrode active material of lithium secondary battery as set forth in claim 1.

13. A hybrid or electric vehicle comprising the lithium secondary battery as set forth in claim 11.

14. A method for manufacturing a negative electrode active material of lithium secondary battery, comprising the steps of:

mixing at least one green coke and at least one calcined coke to produce a mixture of green coke and calcined coke, the mixture comprising a mass ratio of the green coke to the calcined coke of 90:10 to 10:90, the green coke comprising one or more selected from the group consisting of a petroleum-derived green coke and a coal-derived green coke, and the calcined coke comprising one or more selected from the group consisting of a petroleum-derived calcined coke and a coal-derived calcined coke;

adding a phosphorous compound and a boron compound to the mixture of green coke and calcined coke, the phosphorous compound comprising phosphorous, the phosphorous being added to the mixture of green coke and calcined coke in a ratio of 0.1:100 to 6.0:100 parts by mass, the boron compound comprising boron, the boron being added to the mixture of green coke and calcined coke in a ratio of 0.1:100 to 6.0:100; and firing the mixture of the green coke and the calcined coke with the phosphorous compound and the boron compound.

15. The manufacturing method as set forth in claim 14, wherein the green coke and the calcined coke are mixed in a mass ratio of 70:30 to 30:70.

16. The manufacturing method as set forth in claim 14, further comprising the steps of: pulverizing the green coke and the calcined coke to make a powdery green coke and a powdery calcined coke before mixing the green coke and the calcined coke.

17. The manufacturing method as set forth in claim 14,
wherein the phosphorous is added to the mixture of green coke and calcined coke in a ratio 0.5:100 to 5.0:100 parts by mass,
wherein the boron is added to the mixture of green coke and calcined coke in a ratio of 0.5:100 to 5.0:100 parts by mass.

18. The manufacturing method as set forth in claim 14,
wherein the mixture of green coke and calcined coke with the phosphorous compound and the boron compound is fired at a temperature of 800 to 1400° C.

* * * * *